United States Patent
Martin et al.

(10) Patent No.: US 10,503,437 B2
(45) Date of Patent: Dec. 10, 2019

(54) DISTRIBUTED SERVICE LEVEL MANAGEMENT WITH PERFORMANCE RESILIENCE OBJECTIVES

(71) Applicant: EMC IP Holding Company LLC, Hopkinton, MA (US)

(72) Inventors: Owen Martin, Hopedale, MA (US); Arieh Don, Newton, MA (US); Vinay G. Rao, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 15/966,542

(22) Filed: Apr. 30, 2018

(65) Prior Publication Data

US 2019/0332319 A1 Oct. 31, 2019

(51) Int. Cl.
*G06F 3/00* (2006.01)
*G06F 3/06* (2006.01)

(52) U.S. Cl.
CPC .......... *G06F 3/0659* (2013.01); *G06F 3/0604* (2013.01); *G06F 3/0611* (2013.01); *G06F 3/0683* (2013.01)

(58) Field of Classification Search
None
See application file for complete search history.

(56) References Cited

U.S. PATENT DOCUMENTS

| | | |
|---|---|---|
| 8,239,584 B1 | 8/2012 | Rabe et al. |
| 9,330,048 B1 * | 5/2016 | Bhatnagar ........... G06F 13/1642 |
| 9,438,675 B2 * | 9/2016 | Baptist ................ H04L 67/1097 |
| 9,652,367 B1 * | 5/2017 | Vainer ................. G06F 11/3692 |
| 9,684,593 B1 | 6/2017 | Chen et al. |
| 9,703,664 B1 * | 7/2017 | Alshawabkeh ..... G06F 11/3414 |
| 10,268,526 B1 * | 4/2019 | Martin ..................... G06F 9/542 |

OTHER PUBLICATIONS

Stephen Smaldone, et al., U.S. Appl. No. 15/876,143, filed Jan. 20, 2018, "Meeting Backup Window Requirements While Managing Storage Array Backup Load".
Jaeyoo Jung, et al., U.S. Appl. No. 15/874,282, filed Jan. 18, 2018, "Techniques for Increased I/O Performance".
Thomas F. O'Neill, et al., U.S. Appl. No. 15/963,398, filed Apr. 26, 2018, "Time Dependent Service Level Objectives".

* cited by examiner

*Primary Examiner* — Cheng Yuan Tseng
(74) *Attorney, Agent, or Firm* — Muirhead and Saturnelli, LLC

(57) ABSTRACT

Execution of I/O operations for an application is managed to improve consistency of performance for an I/O performance metric for the application. Such control may be achieved by defining a value for a performance resilience objective (PRO) parameter, and applying the PRO value to I/O requests of the application. The PRO value may define a value indicative of an extent to which I/O performance can deviate from a performance objective (e.g., as defined by a service level) over time; i.e., a tolerance for such deviation. Components of a computer network may be configured to apply PRO values to I/O requests for one or more applications. The PRO values of applications may be distributed to one or more components of a data storage system and one or more components of a host system, and these components may be configured to apply the PRO values to I/O requests of the subject applications.

20 Claims, 8 Drawing Sheets

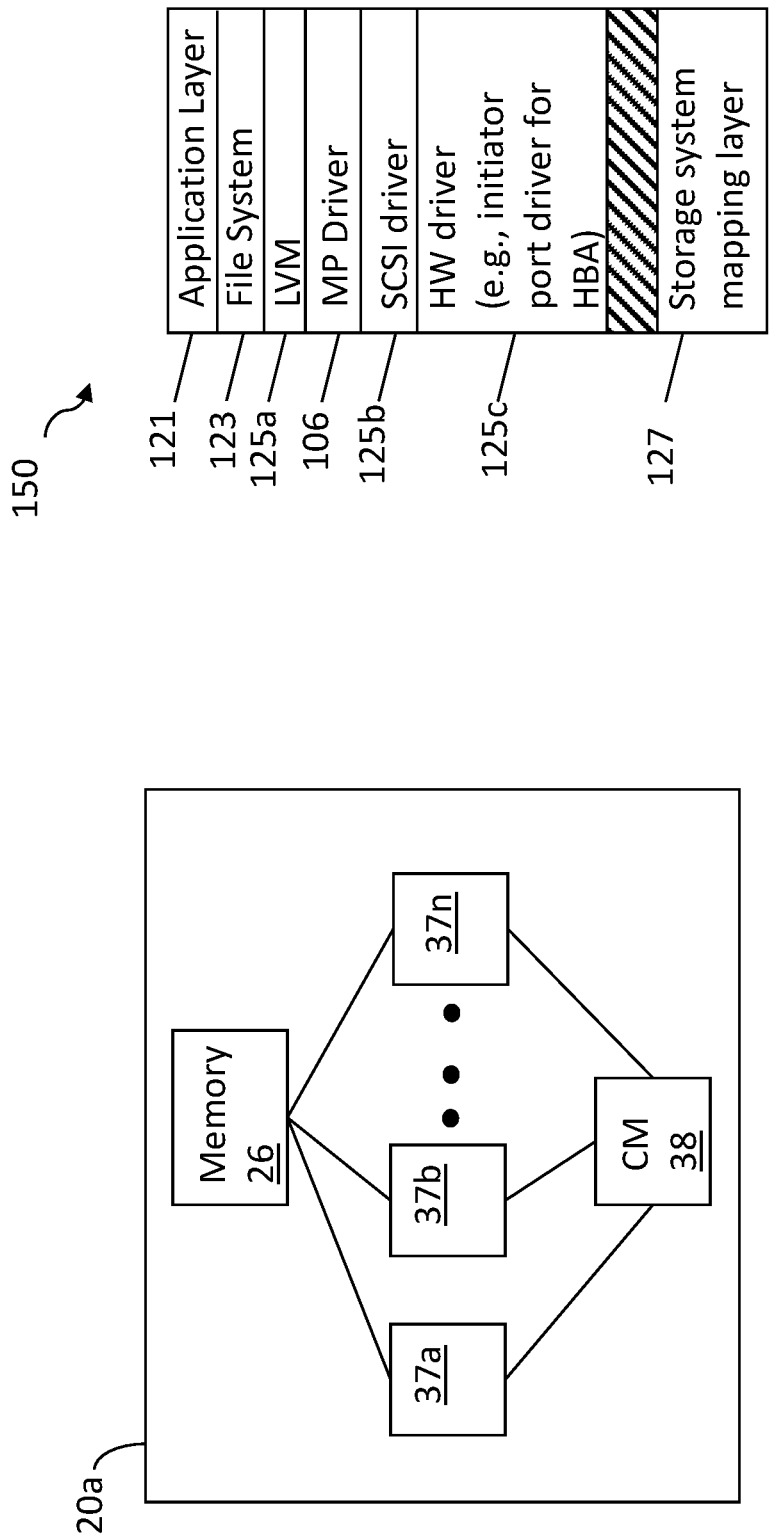

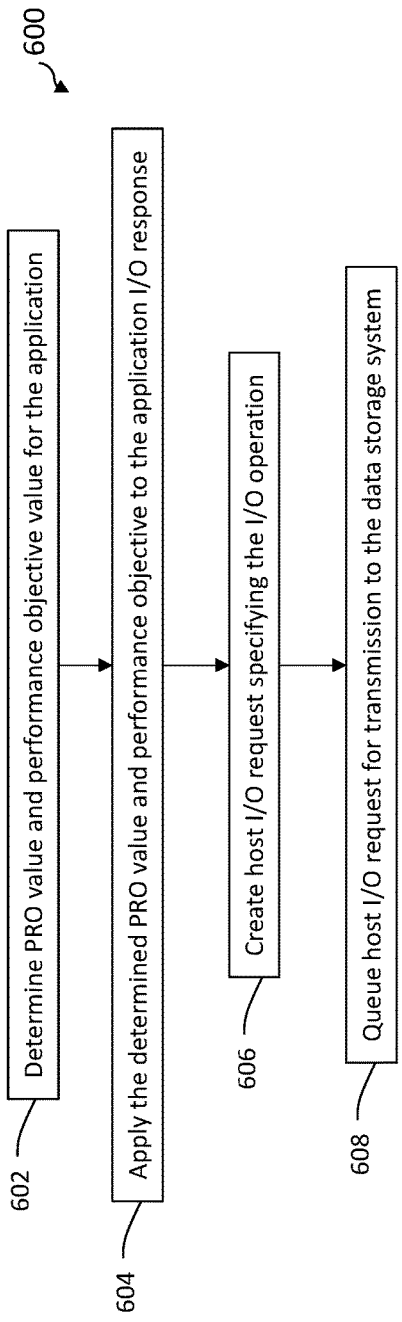
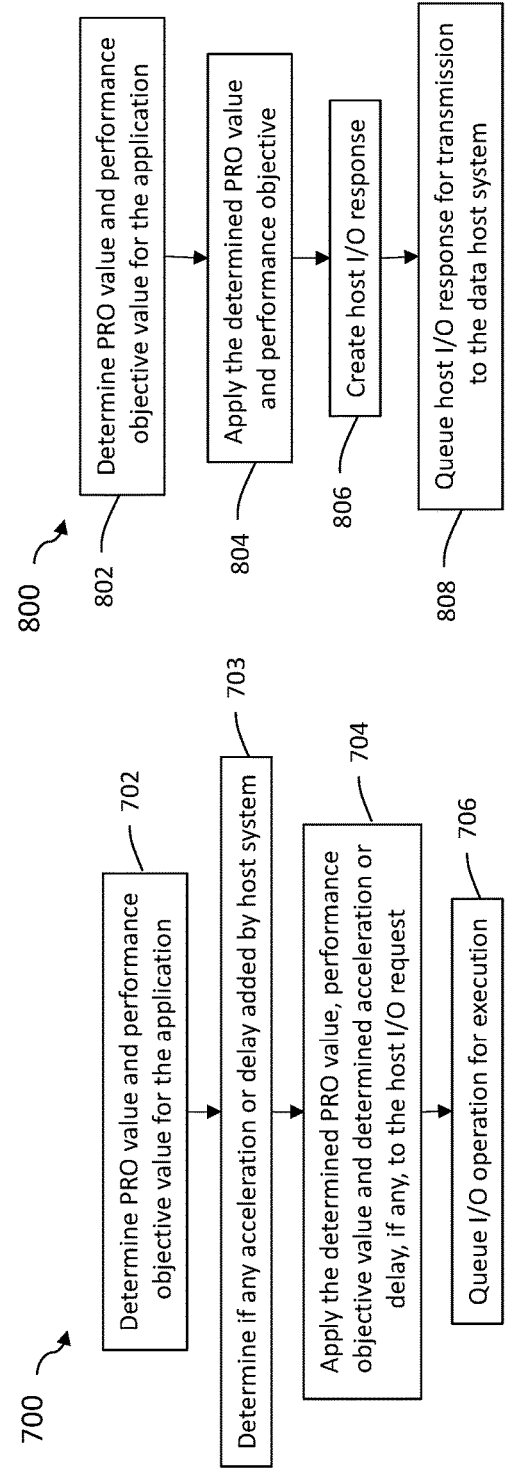
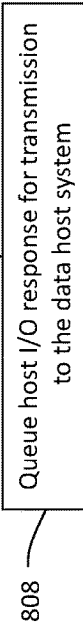

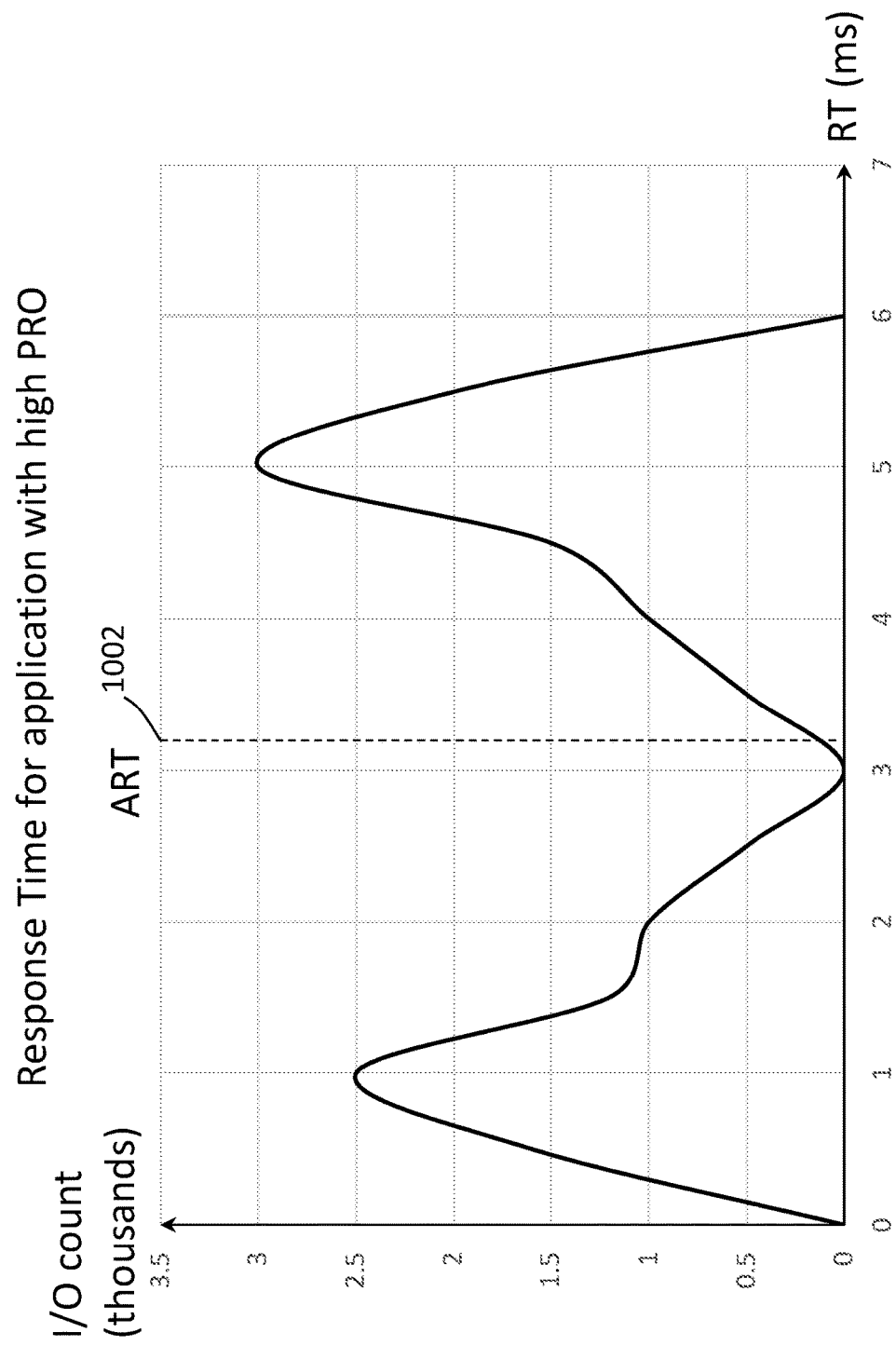

DISTRIBUTED SERVICE LEVEL MANAGEMENT WITH PERFORMANCE RESILIENCE OBJECTIVES

BACKGROUND

Technical Field

This application generally relates to data storage and, in particular, satisfying performance objectives for applications utilizing data storage resources.

Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell EMC. These data storage systems may be coupled to one or more host systems, where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system. Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems also may be used.

SUMMARY OF THE INVENTION

In some embodiments of the invention, a method of managing an I/O request for a storage system is performed. The method includes receiving the I/O request specifying an I/O operation to perform for an application having data stored on the data storage system, the application having an associated first value indicative of a performance objective for a performance metric, and controlling execution of the I/O operation based on the first value associated with the application and a second value indicative of a tolerance of deviation of actual performance from the first value over time. Controlling execution of the I/O operation may include causing a delay in the performance of the I/O operation based at least in part on the second value. Controlling execution of the I/O operation also may include determining a current status of the I/O operation, and causing the delay based at least on the first value, the second value and the current status. Controlling execution also may include accelerating the performance of the I/O operation based at least in part on the second value. Controlling execution also may include applying the second value on a host system prior to sending the I/O request to the storage system. Controlling execution also may include applying the second value on the storage system prior to performing the I/O operation on the storage system. Controlling execution further may include applying the second value on the storage system after performing the I/O operation on the storage system and prior to sending a response to the host system regarding the performing of the I/O operation. The method may further include providing the second value to the storage system and a host system from which the I/O request originates, where controlling execution includes applying the second value on the host system and the storage system. The first value may correspond to a service level associated with the application.

In some embodiments, a system for managing an I/O request for a storage system is provided. The system includes one or more processors and a memory including code stored thereon that, when executed, performs a method including receiving an I/O request specifying an I/O operation to perform for an application having data stored on the data storage system, the application having an associated first value indicative of a performance objective for a performance metric, and controlling a performance of the I/O operation based on the first value associated with the application, the second value indicative of a tolerance of deviation of actual performance from the first value over time. Controlling execution of the I/O operation may include causing a delay in the performance of the I/O operation based at least in part on the second value. Controlling execution of the I/O operation also may include determining a current status of the I/O operation, and causing the delay based at least on the first value, the second value and the current status. Controlling execution also may include accelerating the performance of the I/O operation based at least in part on the second value. Controlling execution also may include applying the second value on a host system prior to sending the I/O request to the storage system. Controlling execution also may include applying the second value on the storage system prior to performing the I/O operation on the storage system. Controlling execution further may include applying the second value on the storage system after performing the I/O operation on the storage system and prior to sending a response to the host system regarding the performing of the I/O operation. The method may further include providing the second value to the storage system and a host system from which the I/O request originates, where controlling execution includes applying the second value on the host system and the storage system. The first value may correspond to a service level associated with the application.

In some embodiments of the invention, provided is a non-transitory computer-readable medium having software stored thereon for managing an I/O request for a storage system. The software includes executable code that receives an I/O request specifying an I/O operation to perform for an application having data stored on the data storage system, the application having an associated first value indicative of a performance objective for a performance metric, and executable code that controls a performance of the I/O operation based on the first value associated with the application, the second value indicative of a tolerance of deviation of actual performance from the first value over time. The executable code that controls execution of the I/O operation may include executable code that causes a delay in the performance of the I/O operation based at least in part on the second value. The executable code that controls execution may include executable code that accelerates the performance of the I/O operation based at least in part on the second value. The software may further include executable code that provides the second value to the storage system and a host system from which the I/O request originates, where the executable code that controls execution includes executable code that applies the second value on the host system and the storage system. The first value may correspond to a service level associated with the application.

BRIEF DESCRIPTION OF THE DRAWINGS

Features and advantages of the present invention will become more apparent from the following detailed description of illustrative embodiments thereof taken in conjunction with the accompanying drawings in which:

FIG. 2B is a block diagram illustrating an example of logical internal communications between directors and memory of the data storage system of FIG. 2A according to embodiments of the invention;

FIG. 4 is a block diagram illustrating an example of a plurality of logical layers of a combination of a host system and a data storage system for processing an I/O request, according to embodiments of the invention;

FIG. 6 is a flowchart illustrating an example of a method of a host system managing an I/O request for a storage system based at least in part on a performance resilience objective, according to embodiments of the invention;

FIG. 7 is a flowchart illustrating an example of a method of a data storage system managing an I/O request for a storage system based at least in part on a performance resilience objective, prior to execution of the I/O operation, according to embodiments of the invention;

FIG. 8 is a flowchart illustrating an example of a method of a data storage system managing an I/O request for a storage system based at least in part on a performance resilience objective, after execution of the I/O operation, according to embodiments of the invention;

FIG. 10 is a chart illustrating an example of resulting I/O response times for an application having a relatively high PRO value, according to embodiments of the invention.

DETAILED DESCRIPTION OF EMBODIMENTS

Figure 1:
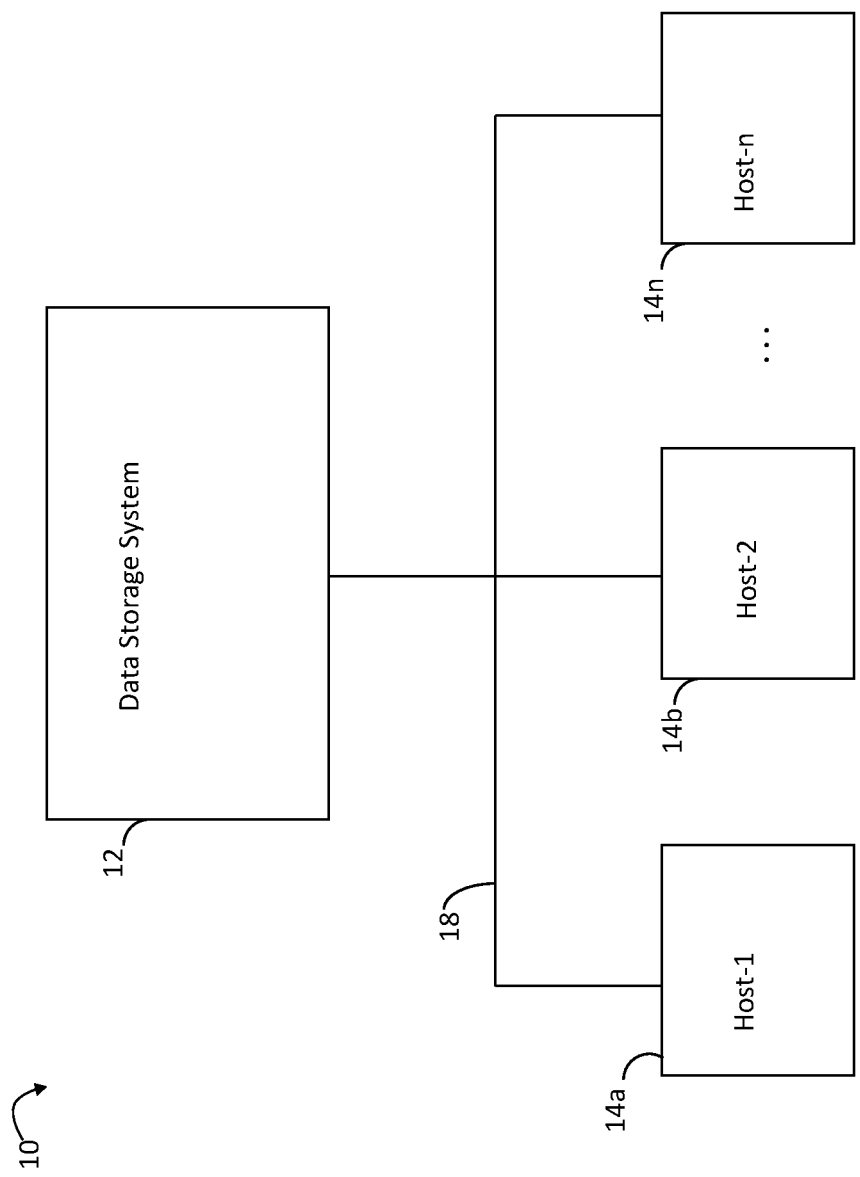
FIG. 1 is a block diagram illustrating an example of a system according to embodiments of the invention.

In known data storage systems, service levels may be defined to establish relative priorities (e.g., in accordance with business priorities) between applications, which enables differentiated performance to be achieved between multiple applications using a same data storage system; i.e., sharing resources of the data storage system. In accordance with these service levels, performance objectives (e.g., service level objectives (SLOs)) may be defined for one or more performance metrics, for example, average response time (ART). In such storage systems, the storage system may be configured to manage I/O operations to achieve the performance objective for the performance metric for one or more applications using the storage system. Multiple applications may correspond to a same customer/tenant or different customers sharing resources on the storage system.

For some applications, the consistency of I/O performance over time may be highly valued (e.g., by a customer), in some cases at the sacrifice of I/O performance level. That is, in some cases, it may be desirable, or at least acceptable, to sacrifice the level of I/O performance over time, or at least during the short term, for consistency of performance over time. For example, a customer may not want to overachieve on performance objectives over one period of time, but underachieve during other periods of time, and may be willing to sacrifice performance level to do so. For example, it may be acceptable to a customer that the average response time (ART) of I/O requests for an application are lower over time if it is necessary to help make the ART more consistent over time. Conversely, for some applications, there may be very little tolerance for deviation from a performance objective, for example, mission critical applications like financial market transactions, whereas other applications like decisions support systems and/or batching processing applications may be more tolerant of such deviation.

Accordingly, described herein are systems and techniques for managing execution of I/O operations for an application to improve consistency of performance for an I/O performance metric for the application, which in some cases may involve lower overall I/O performance over time for the metric. Such control may be achieved by defining a value for a performance resilience objective (PRO) parameter, and applying the defined value (which is sometimes referred to herein as a "PRO value") to I/O requests of the application. The PRO value may define a value indicative of an extent to which I/O performance can deviate from a performance objective (e.g., as defined by a service level) over time; i.e., a tolerance for such deviation. One or more components of a computer network may be configured to apply PRO values to I/O requests for one or more applications. For example, the PRO values of applications and/or their corresponding entities may be distributed to one or more components (e.g., directors) of a data storage system and one or more components (e.g., multi-path drivers) of a host system, and these components may be configured to apply the PRO values to I/O requests of the subject applications. Control of I/O performance of an application or group of applications may be achieved by applying PRO values and performance objective values to their I/O requests.

While performance objectives and PRO values are described herein primarily in relation to I/O requests and operations generally, and response time metrics in particular, it should be appreciated that the invention is not so limited. For example, different performance objectives and PRO values may be specified for different types of I/O operations and metrics thereof. For example, different performance objectives and PRO values may be specified for read and write operations and metrics thereof, for example, average read response time and average write response time, and the techniques described herein may be applied thereto.

For a given I/O request for an application, controlling or managing I/O performance according to embodiments of the invention may include a component of a host system (e.g., MP driver) or data storage system (e.g., director) determining and applying any one or more of the following pieces of information: a performance objective for the I/O request; a PRO value for the I/O request; other performance objectives for the I/O request, and PRO values for same if any; one or more performance objectives for one or more other I/O requests currently being processed by the component, and PRO values for same if any; historical performance data for the application and the applications corresponding to other I/O requests, e.g., in consideration of the performance objective and PRO value if any; current workload of the component or any other components of the system (e.g., one or more data storage systems, host systems and/or network components (e.g., switches) of which the component has knowledge; the current load of one or more I/O paths between the host system and data storage system corresponding to the I/O request; the current status of the I/O request with respect to the performance objective (e.g., the ART objective is 3 ms and 1 ms has already elapsed); other information; or any suitable combination of the foregoing.

Applying PRO values may include host systems and/or data storage systems accelerating and/or adding delays to I/O requests at different stages of the I/O request execution cycle. For example, a host system may accelerate or add delay to an I/O request before it transmits the I/O request to the data storage system, and the data storage system may accelerate or add delay to an I/O request before and/or after it executes the I/O request on the storage system. This acceleration or delay may be achieved using any of a variety of techniques, including, for example, setting one or more parameters defining a priority of an I/O request, e.g., one or more fields of the I/O request itself and/or of metadata or a control signal associated therewith; and/or positioning the I/O request at a particular position within an I/O queue. In the event the host system delays or accelerates performance of an I/O request, it may communicate the extent to which it delayed or accelerated performance to the data storage system, for example, by defining a value of a field in the I/O request sent the data storage system, for example, a field of a SCSI command description block (CDB). This field is sometimes referred to herein as a response time offset (RTO) field. The data storage system then may factor the RTO value, along with a PRO value and performance objective value into its I/O management decisions for the I/O request.

This distributed control of I/O processing based in part on PRO values allows for greater flexibility in achieving desired I/O performance consistency. Host systems can make I/O management decisions for an application using PRO values based on information that may not be available to the one or more data storage systems for the application, for example, information about the communications network (e.g., switches and switch fabrics) between the one or more storage system and the host system, including the current loads on multiple I/O paths through the network, and based on information about the host system itself, including other applications running on the host system that do not use the one or more data storage systems. Similarly, data storage systems can make I/O management decisions for an application using PRO values based on information that may not be available to the host system, for example, information about the current I/O load of the data storage system, which may include I/O for applications not running on the host system.

For example, a host system may decide to add delay to an I/O request for an application based on a performance objective and relatively high PRO value (e.g., high tolerance for deviance) for the application because of a current high workload on the host system including many workloads for applications with relatively high performance objectives and low PRO values (low tolerance for deviation) for same. The host system may use the RTO field in the I/O request it sends to the storage system to indicate a value indicative of the added delay. The storage system then may decide based on its current workload to accelerate execution of the I/O request to attempt to meet the performance objective or at least stay within a certain deviance of the performance objective according to the PRO value, or may decide not to accelerate based on such information. Regardless, the ultimate RT of the I/O request may be recorded and/or made available to both the host system and the storage system. The host system and storage system then may use this RT as part of the historical information when a next I/O request is processed for the application. For example, the host system may note that the earlier I/O request exceeded an ART objective by a certain amount (or the cumulative historic information may reflect this information to some degree), and, applying the PRO value along with other information (e.g., one or more the pieces of information described above), may determine to accelerate the current I/O request, and communicate an indication of this acceleration to the data storage system, which then may factor this new information into its management decisions for (i.e., control of) the current I/O request.

Using PRO values according to embodiments of the invention as described herein may enable the consistency of performance relative to a performance objective to be achieved, which may be desirable for certain applications, even if lower performance over time results. In some embodiments, two or more applications having the same performance objective for a given performance metric, but different PRO values relative to the metric, may experience different consistency of performance but the same average level of performance over time. For example, a first application and second application may have a same performance objective value defined for ART, but the first application may have a lower defined PRO value for ART, meaning less tolerability of deviation of ART from the performance object, than a second application, and as a result the first application may experience greater consistency of ART than the second application. However, the long-term ART for each application may the same or substantially similar.

Illustrative embodiments of the invention will now be described in more detail in relation to the figures.

Referring now to FIG. 1, shown is an example of an embodiment of a system 10 according to some embodiments of the invention. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and also may communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be appreciated that the particulars of the hardware and software included in each of the components that may be included in the data storage system 12 are described herein in more detail, and may vary with each particular embodiment. Each of the host computers 14a-14n and data storage system may all be located at the same physical site, or, alternatively, also may be located in different physical locations. Communication media that may be used to provide the different types of connections between the host computer systems and the data storage system of the system 10 may use a variety of different communication protocols such as SCSI, ESCON, Fibre Channel, iSCSI, or GIGE (Gigabit Ethernet), NVMeoF (NVMe over Fabric) and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
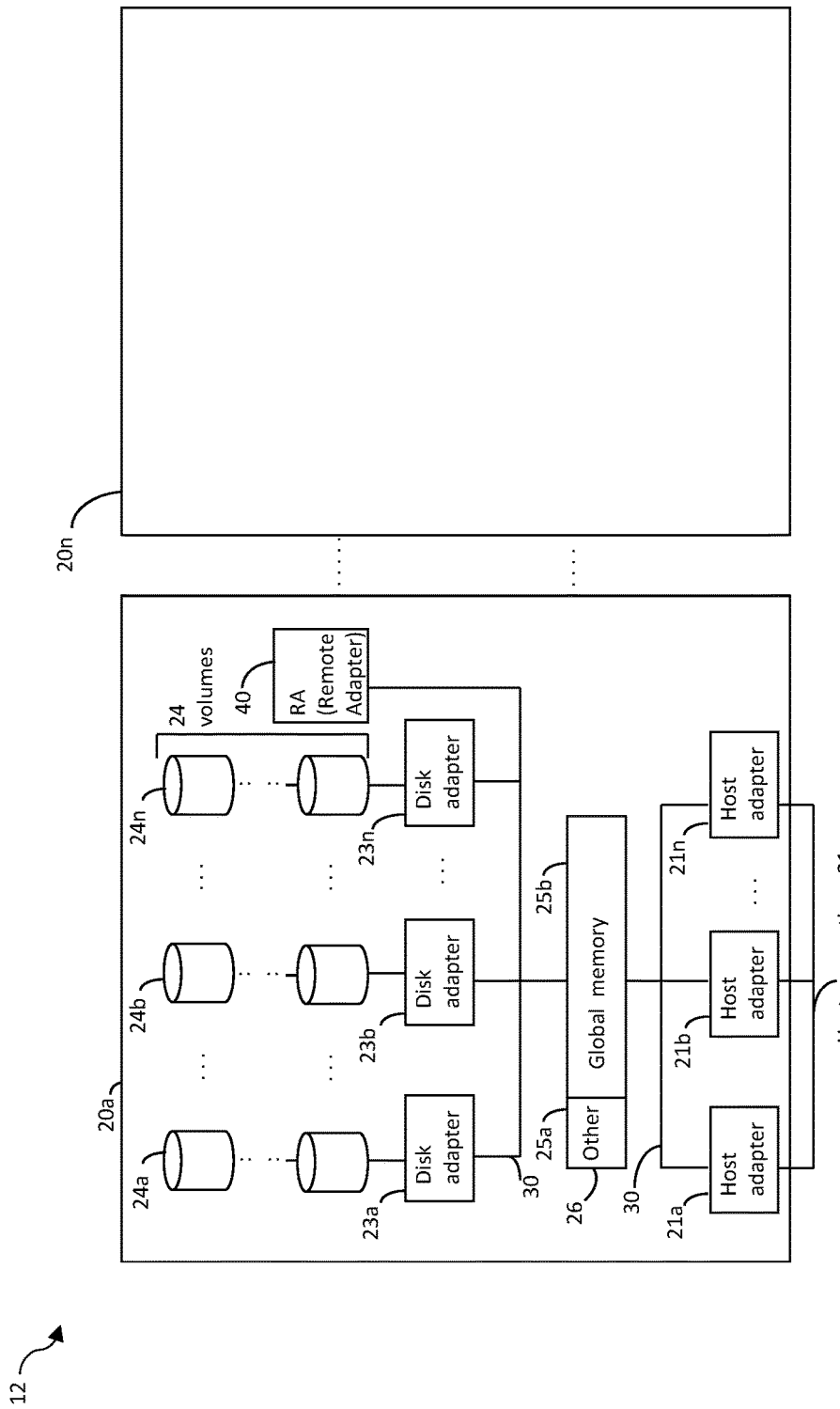
FIG. 2A is a block diagram illustrating an example of a data storage system according to embodiments of the invention.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example, as described in more detail in following paragraphs, reference is made to the more detailed view of element 20a. It should be noted that a similar more detailed description also may apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices (e.g., physical non-volatile storage devices), such as disk devices or volumes, for example, in an arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. System 20a also may include a fabric that enables any of disk adapters 23a-23n to access any of disks or volumes 24-24N, in which one or more technologies and/or protocols (e.g., NVMe or NVMe-oF) may be employed to communicate and transfer data between the DAs and the disks or volumes. The system 20a also may include one or more host adapters ("HAs") or directors 21a-21n. Each of these HAs may be used to manage communications and data operations between one or more host systems and the global memory. In an embodiment, the HA may be a Fibre Channel Adapter or other type of adapter which facilitates host communication.

Also shown in the storage system 20a is an RA or remote adapter 40. The RA may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable storage device such as a rotating disk drive, flash-based storage, and the like. The particular data storage system as described in this embodiment, or a particular device thereof, such as a rotating disk or solid-state storage device (SSD; e.g., a flash-based storage device), should not be construed as a limitation. Other types of commercially available data storage systems, as well as processors and hardware controlling access to these particular devices, also may be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems also may provide data to the host systems also through the channels. The host systems do not address the disk drives of the storage systems directly, but rather access to data may be provided to one or more host systems from what the host systems view as a plurality of logical devices, logical volumes or logical units (LUNs). The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Referring to FIG. 2B, shown is a representation of the logical internal communications between the directors and memory included in a data storage system according to some embodiments of the invention. Included in FIG. 2B is a plurality of directors 37a-37n coupled to the memory 26. Each of the directors 37a-37n represents one of the HAs, RAs, or DAs that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host also may have one or more additional mapping layers so that, for example, a host side logical device or volume is mapped to one or more data storage system logical devices as presented to the host.

Storage system 12 or one or more components thereof described in relation to FIGS. 1-2B may be implemented using one or more Symmetrix®, VMAX® or VMAX3® systems (hereinafter referred to generally as VMAX storage systems) made available from Dell EMC.

Figure 3:
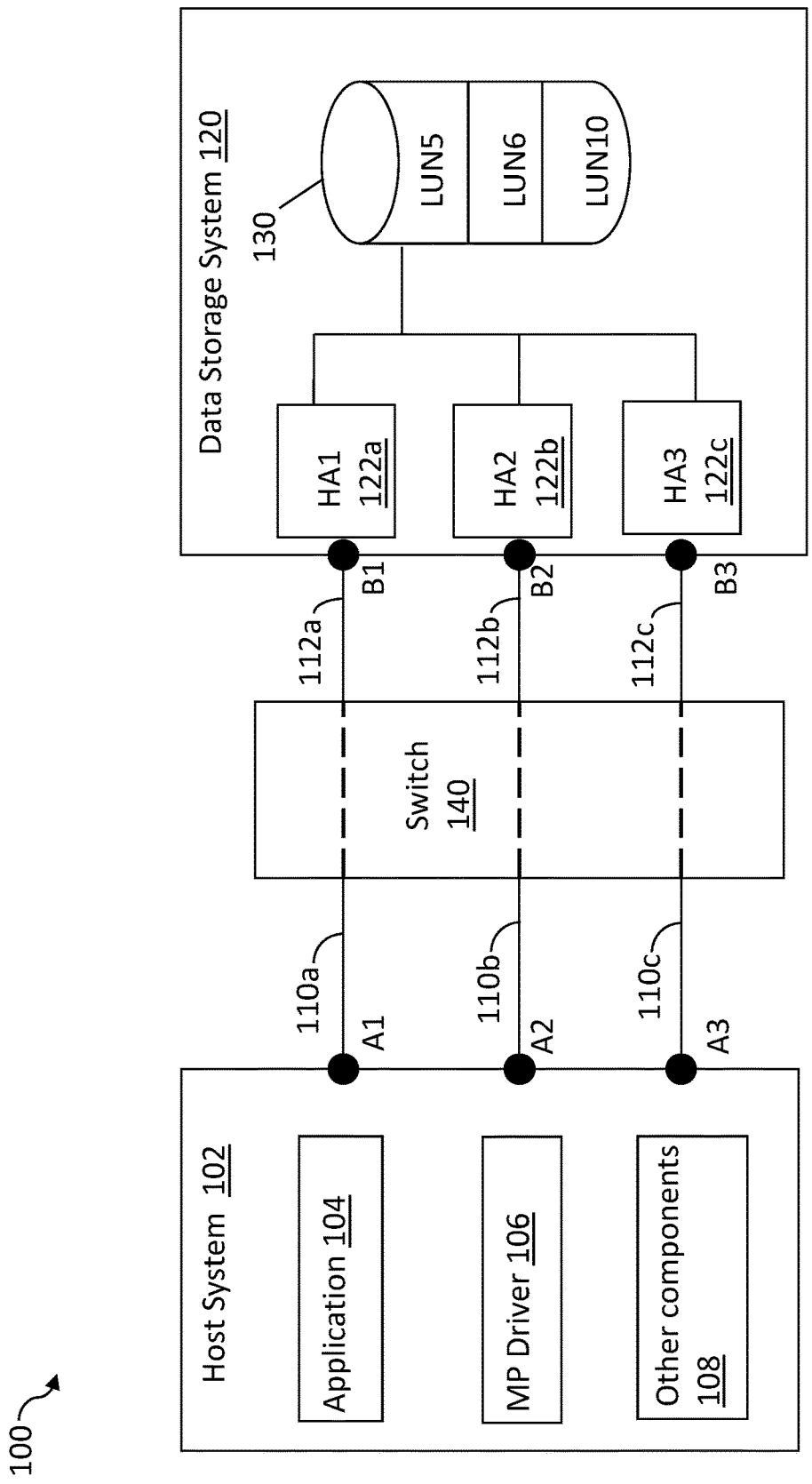
FIG. 3 is a block diagram illustrating an example of a system including a host system communicatively coupled to a data storage system via multiple I/O paths, according to embodiments of the invention.

FIG. 3 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 12 and/or one or more hosts 14a-14n, or variation thereof.

The system 100 may include a host system 102, switch 140 and data storage system 120. The host system 102 and data storage system 120 may communicate over one or more I/O paths through the switch 140. Elements 110a-110c denote connections between the host system 102 and switch 140. Element 112a-112c denote connections between the data storage system 120 and the switch 140. Element 130 may represent a physical storage device of the data storage system 120, such as a rotating disk drive, flash-based or other solid state storage device, or the like, where the physical storage device 130 may be configured to include 3 LUNs—LUN5, LUN6 and LUN10. It should be noted that the system 100 includes only a single host system 102, single physical device 130 with 3 LUNs, a single data storage system 120, and a single switch for purposes of simplicity to illustrate the techniques herein. For example, each of the LUNs may be configured to have storage provisioned from multiple different physical devices rather than a single physical device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LUNs of device 130, configured to be accessible to the host system 102 over multiple I/O paths. As such, each of the I/O operations may be forwarded from the application 104 to the data storage system 120 over one of the possible multiple I/O paths. The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included a commercially available product such as, for example, Dell EMC™ PowerPath® software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical data storage devices, such as device 130, where each such physical device may be configured to store data of one or more LUNs. Each of the LUNs having data stored on the device 130 may be configured to be accessible to the host system 102 through one or more I/O paths. For example, all LUNs of 130 may be accessible using ports of the three front-end directors or interfaces 122a-122c, also denoted respectively HA1, HA2 and HA3. The multiple I/O paths allow the application I/Os to be routed over multiple I/O paths and, more generally, allow the LUNs of device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LUNs of the device 130 in order to determine which of the multiple I/O paths are active or available at a point in time, which of the multiple I/O paths are unavailable for communications, and to use such information to select an I/O path for host system-data storage system communications.

In the example of the system 100, each of the LUNs of the device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an HA of the data storage system 120. In the example of the system 100, elements A1, A2 and A3 each denote a port of a host system 102 (e.g., a port of an HBA), and elements B1, B2 and B3 each denote a port of an HA of the data storage system 120. Each of the LUNs of the device 130 may be accessible over three I/O paths—a first I/O path represented by A1-B1, a second I/O path represented by A2-B2 and a third I/O path represented by A3-B3.

FIG. 4 is a block diagram illustrating an example of a plurality of logical layers 150 of a combination of a host system (e.g., the host system 102 of FIG. 3) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention. FIG. 4 provides further detail regarding various software layers that may be used in connection with the MP driver 106 of FIG. 3. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host system may perceive as corresponding to a physical device address (e.g., the address of one of the disk drives) within the storage system. Below the LVM layer 125a may be the MP (multi-path) driver 106 which handles processing of the I/O received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple I/O path management and selecting one of a plurality of possible I/O paths for use in connection with processing I/O operations and communicating with the data storage system, such as data storage system 120 of FIG. 3. More generally, one or more layers between the application layer 121 and the MP driver 106, for example, the file system 123, may provide for mapping a LUN (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received I/O request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed.

In some embodiments, layers 121-125c are implemented on a host (e.g., the host system 102) coupled to a data storage system (e.g., the data storage system 120) that is an intelligent data storage system having its own mapping layer 127 such that the LUN known or exposed to the host system may not directly correspond to a physical device such as a disk drive. In such embodiments, the LUN specified by the host system in the I/O operation may be further mapped by the data storage system using its mapping layer 127. For example, a LUN specified by the host system may be mapped by the data storage system to one or more physical drives, and multiple LUNs may be located on a same physical device, multiple physical drives, and the like.

The MP driver 106, as well as other components illustrated in FIG. 4, may execute in a kernel mode or another privileged execution mode. In some embodiments using a Unix-based operating system, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable operating systems including a Unix-based operating system, a Linux-based system, any one of the Microsoft Windows® operating systems, or other operating systems. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125a) or files (implemented using the file system 123), whereby such I/O requests may be mapped to I/O communications (specifying the I/O operation) directed to LUNs of the data storage system. Such I/O operations from the application layer 121 may be directed to the MP driver 106 after passing through any intervening layers such as, for example, the layers 123 and 125a. Communications between an initiator port of the host system and a target port of a data storage system (e.g., target port of an HA) may include those related to I/O operations and other non-I/O commands such as related to host system control operations. I/O operations may include, for example, read and write operations with respect to data stored on a LUN.

As used herein, an "application I/O request" is the I/O communication originating at the application layer, which specifies an I/O operation (e.g., read or write) to be performed. A "host I/O request" (sometimes shortened to "I/O request") is the I/O communication ultimately transmitted from the host system to the data storage system after the application I/O request is processed through the appropriate layers of layers 123, 125a, 106, 125b and 125c, which specifies the same I/O operation, but appropriately configured (e.g., mapped and packaged or unpackaged) for consumption by the data storage system. A "host I/O response" (sometimes shortened to "I/O response") is the I/O communication transmitted from the data storage system to the host system in response to the host I/O request, which includes an indication that the I/O operation has been performed (or failed), and in the case of some I/O operations (e.g., a read) includes data. An "application I/O response" is the I/O communication ultimately transmitted to the application in the application layer that originated the application I/O request the response to the application I/O request, after the host I/O response is processed through the appropriate layers of layers 125c, 125b, 106, 125a and 123. The application I/O response includes the same indication (perhaps in another form) that the I/O operation has been performed (or failed), and the same data in the case of some I/O operations (e.g., a read) included in the host I/O response, but appropriately configured (e.g., mapped and packaged or unpackaged) for consumption by the originating application.

In connection with the SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an HA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 3) and a second endpoint which is a port of an HA (e.g., such as B1-B3 of FIG. 3) in the data storage system. Through each such I/O path, one or more LUNs may be visible or exposed to the host system initiator through the target port of the data storage system.

In some embodiments of the invention, the data storage system may provide a multi-tenant (MT) environment whereby multiple tenants store their data on the data storage system. In such an exemplary MT environment, a different service level may be specified for each tenant, and the service level may define one or more performance objectives (e.g., SLOs) for one or more performance metrics for the tenant. For example, the performance objective specified for the tenant may include an average response time (ART) with respect to I/Os issued by the tenant. To further illustrate, a performance objective may specify an ART of 3 milliseconds (ms) for the tenant whereby the tenant is guaranteed to have an ART of 3 ms for each LUN storing the tenant's data. The tenant also may be referred to as a consumer of the data storage system having its data stored on the data storage system. One or more application running on a host system may correspond to a tenant. A performance objective for a tenant may apply to all applications on a host system corresponding to a tenant, or less than all (e.g., one or more) applications.

In some cases, different performance objectives may be defined for one or more different applications of the same tenant. For example, a certain higher-level performance objective may be defined for more mission critical time-sensitive applications, e.g., an application related to equity transactions, whereas a lower-level performance objective may be defined for less mission critical applications, for example, email. Further, it should be noted that different performance objectives may be defined for different applications on a single-tenant system. For example, a storage system may be used exclusively by a single entity (e.g., customer) who is thus the only tenant on the storage system, but the entity may establish performance priority between multiple applications using performance objectives. The performance objectives may be tied to contractual arrangements (e.g., service level agreements (SLAs)) between the customer and the owner of administrator of the storage system, and the customer may pay more for a higher performance objective, all other factors being the same. In some embodiments multiple LUNs may be grouped together in a logic construct called a storage group (SG), which may be logically associated with a specific application and/or specific tenant, and a performance objective may be specified for the SG, and thus indirectly associated with an application.

Additionally, although examples and illustrations herein may refer to a RT specified as a performance objective, it should be noted that a performance objective may be specified using one or more other metrics other than RT. For example, I/O related performance objectives may be specified in terms of guaranteed I/O throughput (e.g., I/O rate such as I/Os per second), data throughput (e.g., megabytes per second), and the like. A performance objective, such as the RT performance objective described herein, may be applied on a per LUN level (e.g., guaranteed for each LUN individually).

If a performance objective is not being met, i.e., when measured or observed performance is worse than as specified by the performance objective metric, for example, when the average measured or observed RT exceeds a performance objective-specified RT, such an occurrence may be referred to herein as a performance objective violation. A performance objective violation may be defined as obtaining a second value for a performance metric, such as ART, based on observed or measured performance values where the second value deviates more than a threshold amount from a specified performance objective value for the performance metric. For example, the performance objective may specify an ART of 3 ms. A performance objective violation may be defined to be a deviation from the ART of 3 ms (as determined from observed or measured RT values) of more than 0.5 ms. That is, a performance objective violation may be determined if the ART based on such measured performance is outside of an RT range of 3 ms+/−0.5 ms or outside the inclusive range of 2.5 ms-3.5 ms. The deviated amount (e.g., 2.5 ms) may be specified as a percentage of the specified performance objective metric value 3 ms, or as a numeric quantity (e.g., real number). It should be appreciated that a performance objective violation also may occur if the measured or observed performance is better than as specified in the performance objective. For example, if the inclusive range of ART specified by a performance objective is 2.5 ms-3.5 ms, an ART of 2.0 ms is actually a shorter response time, i.e, a better performance, but still a violation of the performance objective.

In known systems, responsive to a performance objective violation, remediation processing may be performed to attempt to alleviate, and, if possible, eliminate, the performance objective violation. Any suitable technique may be used to remove the performance objective violation. For example, remediation processing may be performed to increase I/O performance of an application when the measured RT is greater than the specified performance objective RT. For example, if an SG of LUNs has a measured ART of 5 ms and a performance objective of 3 ms, processing may be performed to increase performance of I/Os directed to such LUNs of the SG such as by allocating additional resources for use by the I/Os directed to the SG LUNs, storing or moving the data of the SG LUNs on higher performance physical storage (e.g., migrating or movement of the LUN data to flash-based storage devices), increasing processing priority of pending I/Os directed to such SG LUNs (e.g., giving such pending I/Os directed to the SG LUNs higher priority relative to priority of other pending I/Os directed to other SGs), and the like.

In some embodiments of the invention, in which PRO values are employed, the same or similar remediation measures may be taken, albeit the determination of whether and how to take such measures will depend at least in part on the PRO values. Embodiments of the invention that manage I/O requests, including violation of performance objects, based at least in part on PRO values, will now be described.

Figure 5:
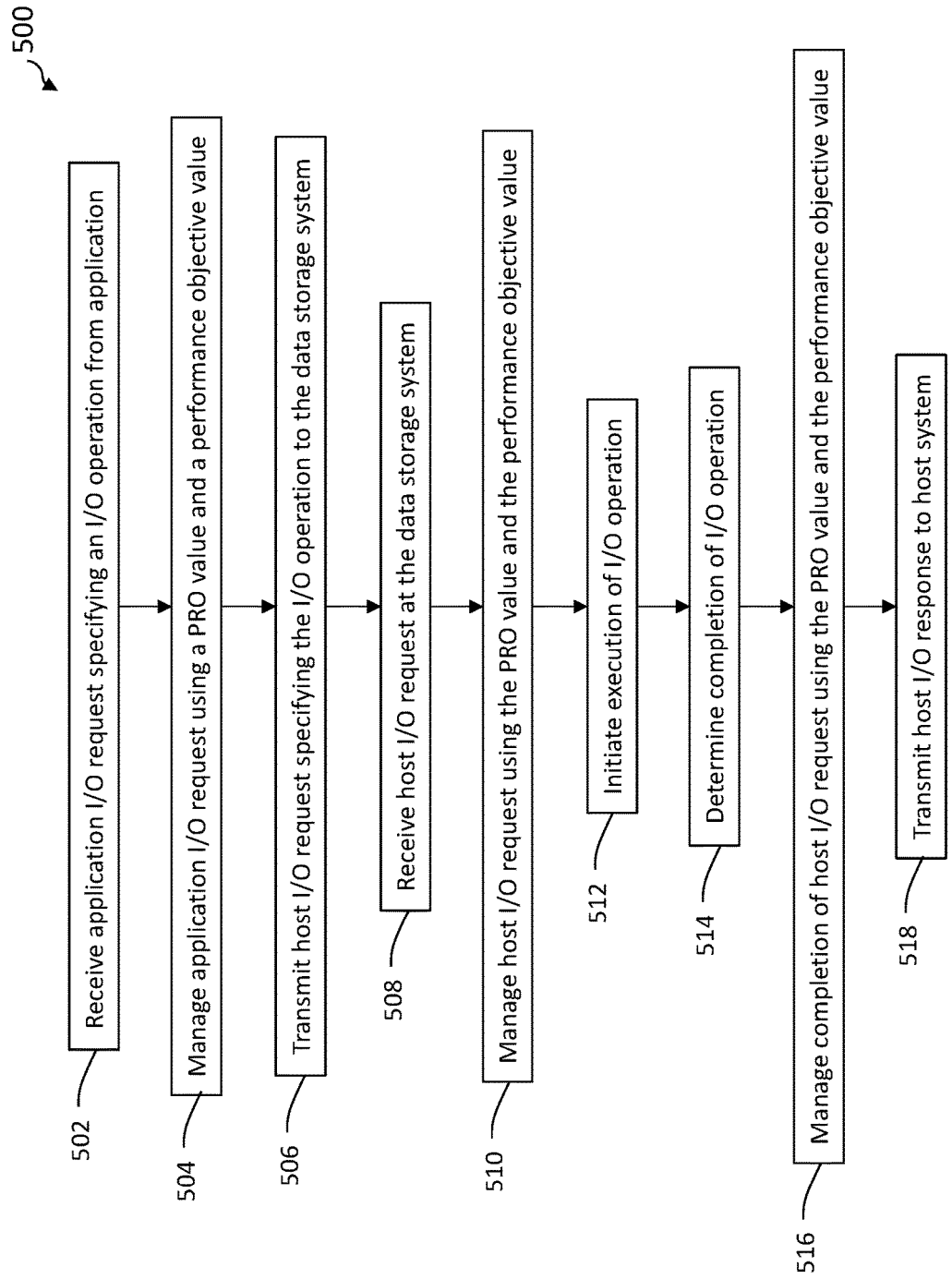
FIG. 5 is a flowchart illustrating an example of a method of managing an I/O request for a storage system based at least in part on a performance resilience objective, according to embodiments of the invention.

FIG. 5 is a flowchart illustrating an example of a method 500 of managing an I/O request for a storage system based at least in part on a PRO, according to embodiments of the invention. Other embodiments of a method of managing an I/O request for a storage system based at least in part on a performance resilience objective, for example, variations of method 500, are possible and are intended to fall within the scope of the invention. Method 500 and/or portions thereof may be implemented using one or more components of the systems described above in relation to FIGS. 1-4.

In a step 502, an application I/O request specifying an I/O operation (e.g., a read or write operation) for an application may be received, for example, at the MP driver 106, and in a step 504, the application I/O request may be managed, for example, by the MP driver, using a PRO value and a performance objective value associated with the application. The step 504 may be implemented in accordance with a method 600 described in relation to FIG. 6.

FIG. 6 is a flowchart illustrating an example of a method 600 of a host system managing an I/O request for a storage system based at least in part on a PRO, according to embodiments of the invention. Other embodiments of a method of a host system managing an I/O request for a storage system based at least in part on a PRO, for example, variations of method 600, are possible and are intended to fall within the scope of the invention. Method 600 and/or portions thereof may be implemented using one or more components of the host systems described above in relation to FIGS. 1-4. In a step 602, a PRO value and performance objective value may be determined. For example, the MP driver 106 may be configured to access one or more data structures that specify performance objective values and PRO values that are specific to the application or to all applications of the customer to whom the application belongs (i.e., on whose behalf the application is being executed), or to an SG or other logical grouping of logical storage devices corresponding to the application. The PRO value may be any of a plurality of types of values, for example, a scalar value, e.g., simple integer value on scale of integer values (e.g., a value from 1-10), or a real value, for example, a number of milliseconds, or a statistical value like a variance or a standard deviation, etc.

The performance objective may be determined from a service level affiliated with the application, for example the customer/tenant corresponding so the application and/or a storage group or the like corresponding to the application. For example, the host system and/or the storage system may be configured to implement a predefined number of service levels, for example, diamond, platinum, gold, silver and bronze, and each of these service levels may define one or more performance objectives, e.g., SLOs. One of these service levels, and thus the defined performance objectives, may be assigned/designated to a customer and all of its applications, or different service levels may be designated to different applications for a customer. In some embodiments, a service level may be assigned to a storage group and the storage group may be associated with the application or customer, such that the service level is indirectly associated with the application. Thus, by accessing one or more data structures defining these relationships, performance objectives for the application and thus the application I/O request can be determined. In some embodiments, these same data structures may specify PRO values for performance objectives, or performance objectives may be defined and maintained in separate data structures, and the association of PRO values with performance objectives for an application or customer may be maintained in these same or different data structures.

In a step 604, the PRO value, performance objective value and other information described herein may be applied (e.g., by the MP driver 106 and/or one or more other host system components) to the application I/O request, which may include producing a host I/O request for the I/O operation, as described in more detail elsewhere herein. The other information applied by the host system may include any of: other performance objectives for the I/O request, and the PRO values for same if any; one or more performance objectives for one or more other I/O requests currently being processed by the host system, and PRO values for same if any; historical performance data for the application that originated the I/O request, historical performance data for applications corresponding to other I/O requests; the current workload of the host system, any information that the host system has about the workloads on one or more data storage systems and/or network components (e.g., switches); the current load of one or more I/O paths between the host system and data storage system corresponding to the I/O request; or any suitable combination of the foregoing.

Applying the PRO value and performance objective value to the I/O request may include accelerating and/or adding delays to the execution of the I/O request. This acceleration or delay may be achieved using any of a variety of techniques. For example, in a step 606, when creating a host I/O request specifying the I/O operation to send to the data storage system, one or more parameters defining a priority of the host I/O request may be defined in one or more fields of the host I/O request itself and/or in metadata or a control signal associated therewith, which then can be accessed and interpreted by one or more storage system components (e.g., a director).

In addition to setting a priority parameter, acceleration or delay can be implemented in a step 608 when queuing the host I/O request for transmission to the data storage system. For example, the host I/O request may be positioned at a particular position within an I/O queue relative to the beginning or end of the queue. Further, in some embodiments, one or more queues may have priority over other queues, and the queue selected for the I/O request may impact acceleration or delay of execution of the host I/O request. In some embodiments, execution of the host I/O request may be delayed or accelerated by selection of an the I/O path from the host system to the data storage system. That is, the host system (in particular an MP driver) may have knowledge of the current workload and bandwidth utilization of the I/O paths, and utilize this information to select faster or slower I/O paths.

In the event the host system delays or accelerates performance of an I/O request, it may communication the extent to which it delayed or accelerated performance to the data storage system. For example, in the step 606, a value of a field may be defined in the host I/O request to be sent the data storage system, for example, a field of a SCSI command description block (CDB). This field is sometimes referred to herein as a response time offset (RTO) field. For example, reserved bits (as defined by SCSI) may be used as the RTO field, and the number of available reserved bits may define a granularity of acceleration or delay that can be specified. For example, if 4 bits are available, up to 16 different values can be expressed. One value can be used to indicate no change, and the rest of the values can be used to express a raw amount (e.g., millisecond) or relative amount indicative of the delay or acceleration introduced. For example, a value of 1-7 can be used to indicate a raw or relative amount of acceleration introduced, and values of 8-15 can be used to indicate a delay (e.g., 16-x, x being 7-15, representing the amount of delay). In some embodiments, the RTO offset may express a number relative to a service level or other value known by the system relative to desired or required performance. For example, ins some embodiments, the service levels defining performance objectives are expressed as an integer, and the RTO offset may specify a positive or negative integer relative to the service level.

For example, an application may have a predefined ART objective of 5 ms defined, for example, based on a service level of the customer/consumer of the application. The host system may decide to add a 2 ms delay to the host I/O based on a relatively high PRO value (e.g., high tolerance for deviance) for the application because of a current high workload on the host system including many workloads for applications with relatively high performance objectives and low PRO values (low tolerance for deviation) for same. The host system then may set the RTO field in the host I/O request to a value indicative of the 2 ms delay it added. Part of the logic in making this decision is that the data storage system may be able to accommodate this delay by accelerating execution of the I/O operation, in particular when it learns that the host introduced a 2 ms delay. Further logic in making this decision is that that host system may be able to accelerate completing the I/O request cycle and issuing a response to the application when it receives a response from the storage system for the I/O request. In fact, the host system may be configured with logic that can predict a lighter workload when the response is received. Further, the host system may be configured with logic that it can accelerate future I/O requests to accommodate for this delay (assuming the storage system is not able to accelerate enough to compensate for the delay) when the host system is less busy with other I/O requests, in particular I/O requests having high performance objectives and/or low PRO values, which the host system may be configured to predict.

Returning to the method 500, in a step 506, the host I/O request may be transmitted from the host system (e.g., by an HBA) to the data storage system, for example, the data storage system 120 via switch 140 and other network components. The selected I/O path between the host system and storage system may have been selected by the MP driver 106, as described above. Thus, in some embodiments, the steps 502-506 may be performed by a host system, for example, the host system 102.

In a step 508, the host I/O request may be received at a port of the data storage system, and in a step 510 the host I/O request may be managed using the PRO value and the performance objective value, for example, by one or more directors (e.g., one of directors 37a-37b of data storage system 20a). The step 510 may be implemented using a method 700 described in relation to FIG. 7.

FIG. 7 is a flowchart illustrating an example of a method 700 of a data storage system managing an I/O request for a storage system based at least in part on a PRO, prior to execution of the I/O request, according to embodiments of the invention. Other embodiments of a method of a data storage system managing an I/O request for a storage system based at least in part on a PRO, prior to execution of the I/O request, for example, variations of method 700, are possible and are intended to fall within the scope of the invention. Method 700 and/or portions thereof may be implemented using one or more components of the data storage systems described above in relation to FIGS. 1-4.

In a step 702, a PRO value and performance objective value may be determined, for example, by a director other component of the data storage system. For example, this may be determined using the same or similar techniques to those described above in relation to the step 602 of method 600.

In a step 703, it may be determined whether any acceleration or delay was added to the I/O request by the host system, for example by inspection of the RTO field of the I/O request. In a step 704, the PRO value, performance objective value, determined acceleration or delay, if any, and other information described herein may be applied (e.g., by a director and/or one or more other host system components) to the application I/O request. The other information applied by the data storage system may include any of: other performance objectives for the I/O request, and PRO values for same if any; one or more performance objectives for one or more other I/O requests currently being processed by the data storage system, and PRO values for same if any;

historical performance data for the application and the applications corresponding to other I/O requests executing on the data storage system, e.g., in consideration of the performance objective and PRO value if any; current workload of the data storage system and/or specific directors and other components thereof, including physical storage devices; any knowledge the data storage system has about host systems and/or network components; the current status of the I/O request with respect to the performance objective (e.g., the ART objective is 6 ms and 1 ms has already elapsed); other information, or any suitable combination of the foregoing.

The data storage system applying the PRO value, performance objective value and determined acceleration and delay, if any, to the I/O request may include accelerating and/or adding delays to the execution of the I/O operation. This acceleration or delay may be achieved using any of a variety of techniques. For example, when queuing the I/O operation for execution in a step 706, the I/O operation may be positioned at a particular position within an I/O queue relative to the beginning or end of the queue. Further, in some embodiments, one or more queues may have priority over other queues, and the queue selected for the I/O operation may impact acceleration or delay of execution of the I/O operation.

For example, an application may have a predefined ART objective of 5 ms defined, for example, based on a service level of the customer/consumer of the application, and may have a relatively high PRO value. The data storage system may determine, e.g., from the RTO offset field, that a 2 ms delay was added by the host system. The data storage system may determine to accelerate execution of the I/O operation to try to still meet the 5 ms ART objective because of a current relatively low workload on the data storage system and/or because many workloads have high PRO values (high tolerance for deviation). Alternatively, data storage system may determine to add delay to the execution of the I/O operation because of a current relatively high workload on the data storage system and/or because many workloads have low PRO values. The data storage system then may determine an I/O operation queue and/or position on such a queue based on whether it wants to accelerate, delay or do neither. The decision whether to accelerate, delay or do neither also may be based on workload predictions that that the data storage system may be configured to determine.

Returning to the method 500, in a step 512, execution of the I/O operation may be initiated, for example, in accordance with I/O management decisions made in the step 510. For example, a director may queue the I/O operation for execution on one or more physical storage devices (e.g., disks or SSDs 24a-n of the storage system 20a). In a step 514, it may be determined that the I/O operation has been completed, for example, based on one or more responses received from the one or more physical storage devices on which the I/O operation was executed. In a step 516, completion of the host I/O request may be managed using the PRO value and the performance objective value, for example, in accordance with the method 800 described in relation to FIG. 8.

FIG. 8 is a flowchart illustrating an example of a method 800 of a data storage system managing an I/O request for a storage system based at least in part on a PRO after execution of the I/O operation, according to embodiments of the invention. Other embodiments of a method of a data storage system managing an I/O request for a storage system based at least in part on a PRO, after execution of the I/O request, for example, variations of method 800, are possible and are intended to fall within the scope of the invention. Method 800 and/or portions thereof may be implemented using one or more components of the data storage systems described above in relation to FIGS. 1-4. In a step 802, the PRO value and performance objective value may be determined, for example, by a director other component of the data storage system. For example, this may be determined using the same or similar techniques to those described above in relation to the step 602 of method 600.

In a step 804, the PRO value, performance objective value, and other information described herein may be applied (e.g., by a director and/or one or more other host system components) to the application I/O request. The other information applied by the data storage system may include any of the information described in relation to the step 704 in relation to FIG. 7, and, in addition, information about the execution of the I/O operation, for example, the additional time added to the I/O execution cycle for the I/O request by execution of the I/O request on the one or more physical storage devices.

The host system applying the PRO value and performance objective value to the I/O request may include accelerating and/or adding delays to the execution cycle of the I/O request. This acceleration or delay may be achieved using any of a variety of techniques. For example, after creating the host I/O response in a step 806, when queuing the host I/O response for transmission to the host system in a step 808, the host I/O response may be positioned at a particular position within an I/O queue relative to the beginning or end of the queue. Further, in some embodiments, one or more queues may have priority over other queues, and the queue selected for the host I/O response may impact acceleration or delay of execution of the host I/O response.

Returning to the method 500, in a step 518, the host I/O response may be transmitted from the data storage system to the host system. The host system then may complete processing of the host I/O request, for example, by processing the host I/O response through the plurality of logical layers 125c, 125b, 106, 125a and 123a, and communicating a response to the original application I/O request (i.e., an application I/O response) to the application within the application layer 121. The steps 508-518 may be performed by a data storage system, for example, the data storage system 120.

Figure 9:
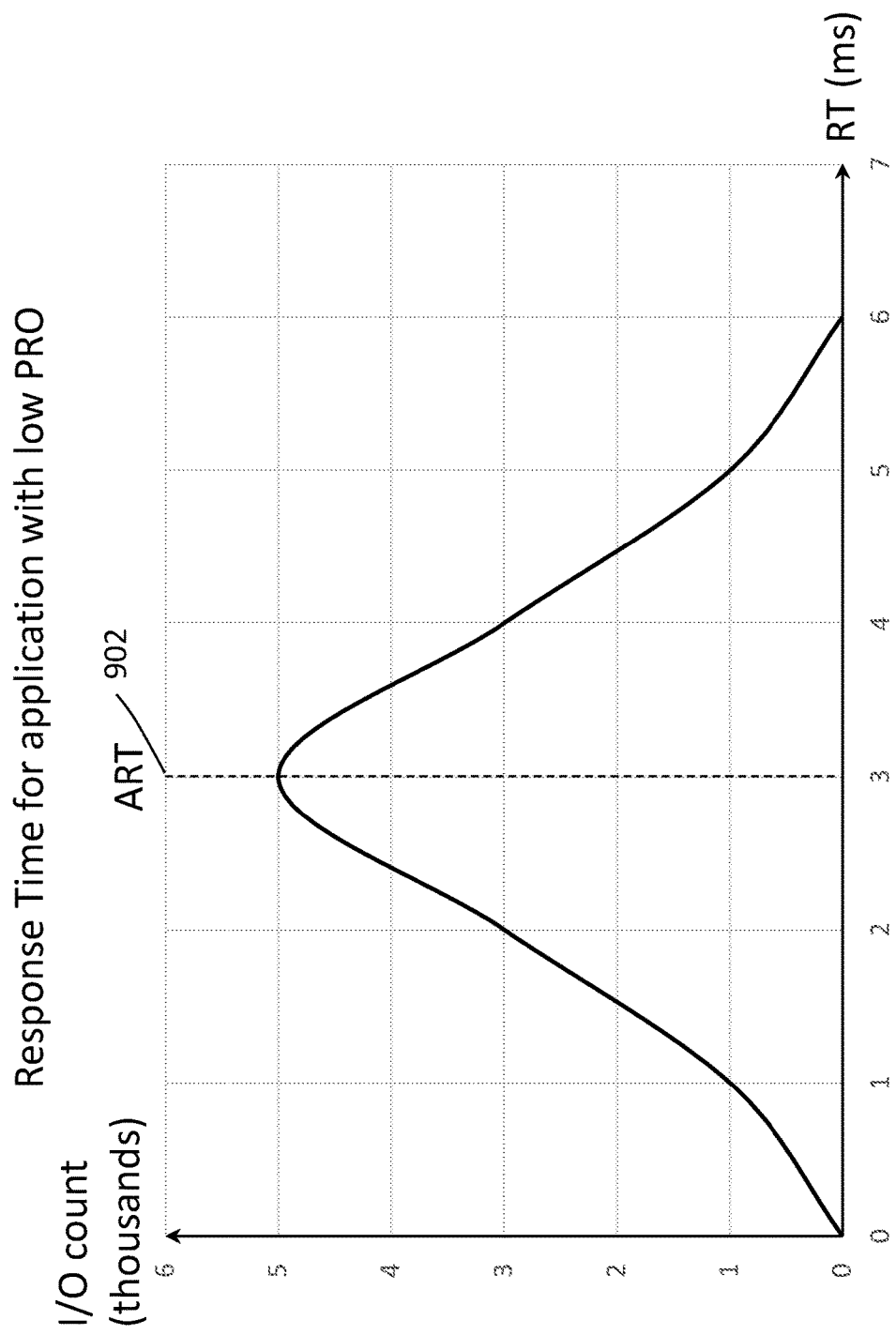
FIG. 9 is a chart illustrating an example of resulting I/O response times for an application having a relatively low PRO value, according to embodiments of the invention.

FIG. 9 is a chart illustrating an example of a distribution of I/O response times that may result over a period of time for an application for which a relatively low PRO value (i.e., a low tolerance for deviation from a performance objective) with respect to an RT objective is applied, according to embodiments of the invention. In the example of FIG. 9, the X-axis represents RT in milliseconds, the y-axis represents a number of I/O responses (in thousands), i.e., I/O count, and values represented by the plotted curve represent the number of I/O responses determined to have the indicated RT over the period of time. In the example of FIG. 9, the performance objective is an ART of 3 ms, and the actual observed ART is 902. It should be appreciated that the observed ART is made the same as the ART objective for illustrative purposes, as at least some deviation from the ART objective can result in practice, even with a very low PRO value for ART. In the example of FIG. 9, because of the low PRO, there is little deviation of response times from the ART objective of 3 ms.

FIG. 10 is a chart illustrating an example of a distribution of I/O response times that may result over a period of time for an application for which a relatively high PRO value (i.e., a high tolerance for deviation from a performance objective) with respect to an RT objective is applied, according to embodiments of the invention. As in FIG. 9, in the example of FIG. 9, the X-axis represents RT in milliseconds, the y-axis represents a number of I/O responses (in thousands), i.e., I/O count, and values represented by the plotted curve represent the number of I/O responses determined to have the indicated RT over the period of time. As in FIG. 9, in the example of FIG. 10, the performance objective is an ART of 3 ms. In comparison to the RT distribution illustrated in the example of FIG. 9, the distribution illustrated in FIG. 10 illustrates a greater degree of deviation of observed RT from the ART objective of 3 ms, as a result of a higher tolerance for deviation. However, the average observed RT 1002 is slightly greater than the ART objective, and slightly higher than the observed FT 902 illustrated in FIG. 9. While this will not always be the case in practice, in fact there may be no greater likelihood that it will be the case, it illustrates that, in some cases, a lower PRO for a performance object, i.e., a lower tolerance for deviation from the performance objective, may result in lower performance over time. That is, long-term performance may be sacrificed for performance consistency. In other cases, the a lower PRO may result in a better long-term performance or about the same long-term performance.

As described above, the steps 502-506, including the method 600, may be performed by a host system, e.g., the host system 102, and the steps 508-518, including methods 700 and 800, may be performed by a data storage system, for example, the data storage system 120, thereby providing a distributed management or control of I/O processing based at least in part on PRO values, which may provide a kind of distributed management of service levels for applications. This distributed management of I/O processing based in part on PRO values allows for greater flexibility in achieving desired I/O performance consistency. Host systems can make I/O management decisions for an application using PRO values based on information that may not be available to the one or more data storage systems for the application, for example, information about the communications network (e.g., switches and switch fabrics) between the one or more storage system and the host system, including the current loads on multiple I/O paths through the network, and based on information about the host system itself, including other applications running on the host system that do not use the one or more data storage systems. Similarly, data storage systems can make I/O management decisions for an application using PRO values based on information that may not be available to the host system, for example, information about the current I/O load of the data storage system, which may include I/O for applications not running on the host system.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 500, 600, 700 and/or 800, or parts thereof, may be implemented using one or more of the systems described in relation to FIGS. 1-4 or components thereof. Further, various aspects of the invention may be implemented using software, hardware, a combination of software and hardware and/or other computer-implemented modules or devices having the described features and performing the described functions.

Software implementations of embodiments of the invention may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. Embodiments of the invention may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of managing an I/O request for a storage system, the method comprising:
receiving the I/O request specifying an I/O operation to perform for an application having data stored on the data storage system, the application having an associated first value indicative of a performance objective for a performance metric; and
controlling execution of the I/O operation based on the first value associated with the application and a second value indicative of a tolerance of deviation of actual performance from the first value over time,
wherein the first value specifies an average response time, and wherein the second value specifies an extent to which an actual response time is allowed to deviate over time from the average response time.

2. The method of claim 1, wherein controlling execution of the I/O operation includes causing a delay in the performance of the I/O operation based at least in part on the second value.

3. The method of claim 2, wherein controlling execution of the I/O operation includes determining a current status of the I/O operation, and causing the delay based at least on the first value, the second value and the current status.

4. The method of claim 1, wherein controlling execution includes accelerating the performance of the I/O operation based at least in part on the second value.

5. The method of claim 1, wherein controlling execution includes applying the second value on a host system prior to sending the I/O request to the storage system.

6. The method of claim 1, wherein controlling execution includes applying the second value on the storage system prior to performing the I/O operation on the storage system.

7. The method of claim 1, wherein controlling execution includes applying the second value on the storage system after performing the I/O operation on the storage system and prior to sending a response to the host system regarding the performing of the I/O operation.

8. The method of claim 1, further comprising:
providing the second value to the storage system and a host system from which the I/O request originates,
wherein controlling execution includes applying the second value on the host system and the storage system.

9. The method of claim 1, wherein the first value corresponds to a service level associated with the application.

10. A system for managing an I/O request for a storage system, the system comprising:
one or more processors; and
a memory comprising code stored thereon that, when executed, performs a method comprising:

receiving an I/O request specifying an I/O operation to perform for an application having data stored on the data storage system, the application having an associated first value indicative of a performance objective for a performance metric; and controlling a performance of the I/O operation based on the first value associated with the application and a second value indicative of a tolerance of deviation of actual performance from the first value over time, wherein the first value specifies an average response time, and wherein the second value specifies an extent to which an actual response time is allowed to deviate over time from the average response time.

11. The system of claim 10, wherein controlling execution of the I/O operation includes causing a delay in the performance of the I/O operation based at least in part on the second value.

12. The system of claim 11, wherein controlling execution of the I/O operation includes determining a current status of the I/O operation, and causing the delay based at least on the first value, the second value and the current status.

13. The system of claim 10, wherein controlling execution includes accelerating the performance of the I/O operation based at least in part on the second value.

14. The system of claim 10, wherein the method further comprises providing the second value to the storage system and a host system from which the I/O request originates, and
wherein controlling execution includes applying the second value on the host system and the storage system.

15. The system of claim 10, wherein the first value corresponds to a service level associated with the application.

16. A non-transitory computer-readable medium having software stored thereon for managing an I/O request for a storage system, the software comprising:

executable code that receives an I/O request specifying an I/O operation to perform for an application having data stored on the data storage system, the application having an associated first value indicative of a performance objective for a performance metric; and executable code that controls a performance of the I/O operation based on the first value associated with the application and a second value indicative of a tolerance of deviation of actual performance from the first value over time, wherein the first value specifies an average response time, and wherein the second value specifies an extent to which an actual response time is allowed to deviate over time from the average response time.

17. The non-transitory computer-readable medium of claim 16, wherein the executable code that controls execution of the I/O operation includes executable code that causes a delay in the performance of the I/O operation based at least in part on the second value.

18. The non-transitory computer-readable medium of claim 16, wherein the executable code that controls execution includes executable code that accelerates the performance of the I/O operation based at least in part on the second value.

19. The non-transitory computer-readable medium of claim 16, wherein the software further comprises:
executable code that provides the second value to the storage system and a host system from which the I/O request originates,
wherein the executable code that controls execution includes executable code that applies the second value on the host system and the storage system.

20. The non-transitory computer-readable medium of claim 16, wherein the first value corresponds to a service level associated with the application.

* * * * *